United States Patent Office

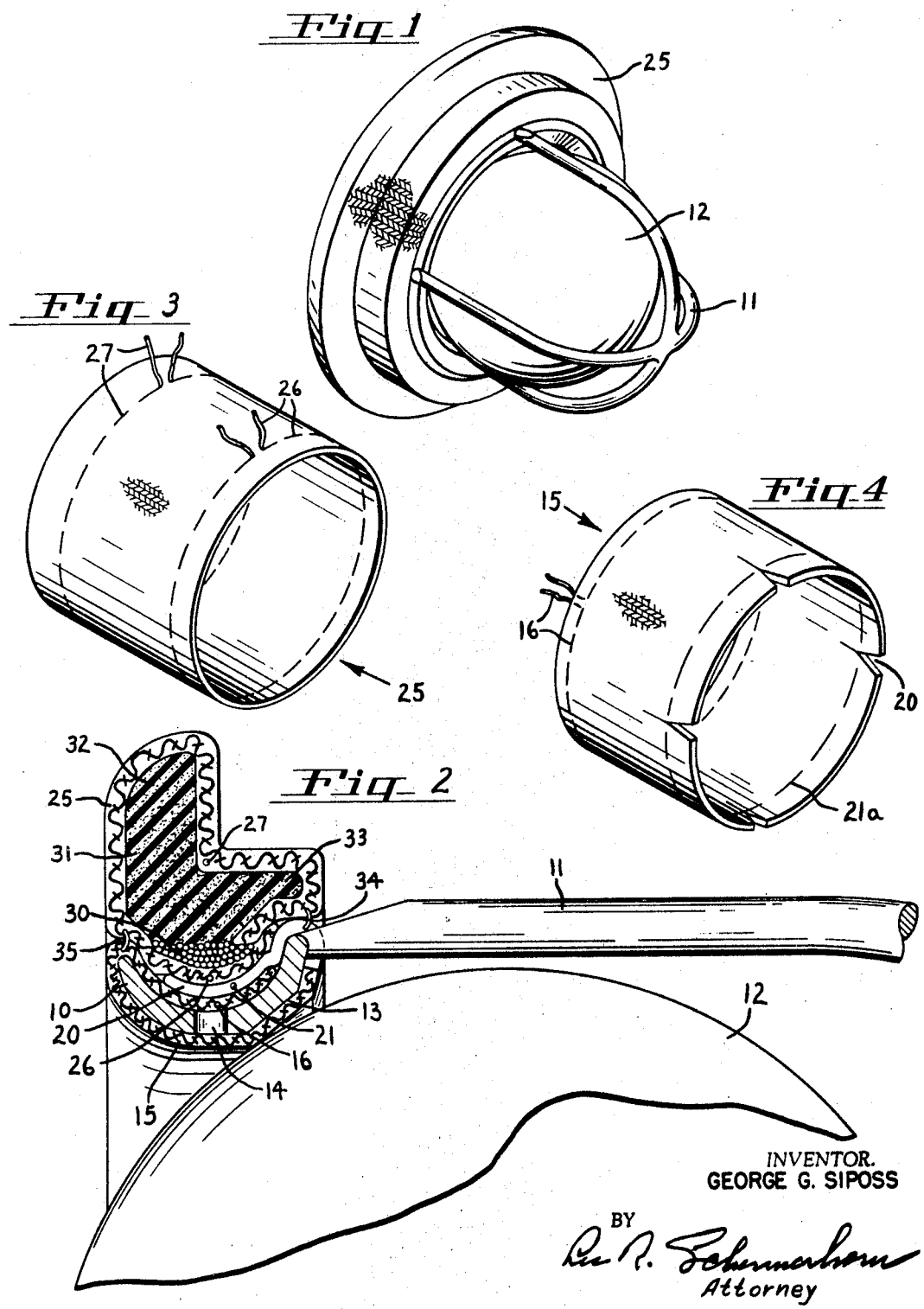

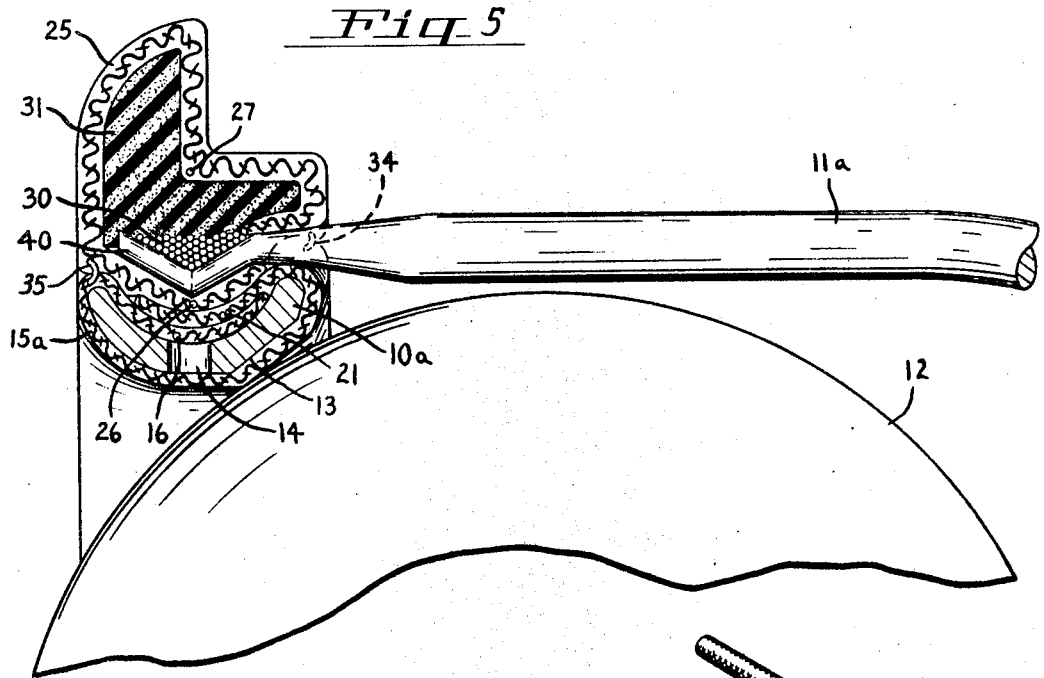
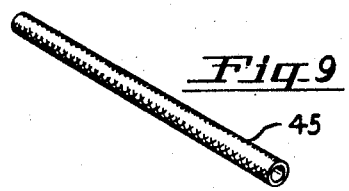
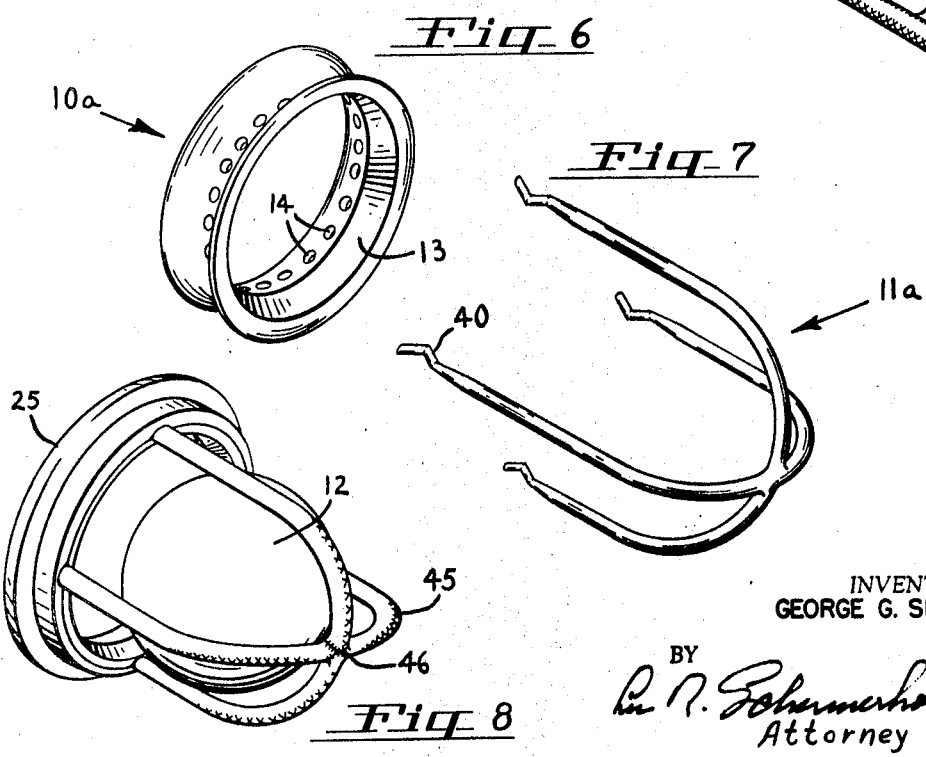

3,466,671
Patented Sept. 16, 1969

3,466,671
HEART VALVE PROSTHESIS HAVING A CLOTH COVERED BODY
George Geza Siposs, Garden Grove, Calif., assignor to Edwards Laboratories, Inc., Santa Ana, Calif., a corporation of California
Filed Oct. 19, 1966, Ser. No. 587,806
Int. Cl. A61f *1/00*; F16k *15/00*
U.S. Cl. 3—1                                        14 Claims

ABSTRACT OF THE DISCLOSURE

A cloth sleeve extends through the center of the orifice ring and has end portions folded into an annular channel on the outside of the ring. A suturable cuff surrounds the ring. A winding of thread secures portions of the sleeve and cuff in the channel. In a modification, the ball cage is made as a separate part and secured to the ring by said winding. The cage legs may be covered with cloth sleeves whereby the orifice ring and cage are completely cloth covered.

---

This invention relates to improvements in a heart valve prosthesis and has particular reference to the provision of a porous covering on the valve body.

Soon after a heart valve prosthesis is implanted, the natural process of the body tends to cover the invading foreign body with a thin layer of glistening coating called pseudo-intima, so-called because it closely resembles the inside lining or intima of the blood vessels. In certain prior valves a cloth, or cloth covered, suturing ring has been secured to a metal valve cage which includes a circular valve seat defining an orifice in the valve. Thus, the valve seat and the immediate inflow face have had smooth metal surfaces directly exposed to the blood stream.

Experience shows that the development of the pseudo-intima on the suturing ring does not necessarily stop at the cloth-metal inter-face. In some cases it tends to cover the metal as well. Not having a porous surface to anchor itself into, this portion of the pseudo-intima is cantilevered from the porous suturing ring and may break off at the junction of the metal and cloth surfaces. It is highly desirable to provide secure anchorage for the pseudo-intima on at least all major surfaces of the valve adjacent to the suturing ring so that pieces will not break off and be carried along in the blood stream.

Objects of the invention are, therefore, to provide a porous covering capable of ingrowth by the pseudo-intima for securely anchoring any pseudo-intima which may extend over non-porous parts of the valve body in a heart valve prosthesis, to provide cloth sleeves for covering the structural parts and to provide a valve having separate orifice ring and cage members for a movable valve member.

According to the present invention, a porous covering for anchorage of the pseudo-intima is extended from the suturing ring to embrace the whole valve body, with the possible exception of the cage legs but these may also be covered. This is accomplished by enclosing at least the metal ring portion of the valve body in a cloth sleeve. With such a cloth covering into which the pseudo-intima can grow and anchor itself firmly, accidental separations of the pseudo-intima coating from the valve and the resulting embolic episodes are prevented. Several embodiments of mitral valves are illustrated by way of example but it is to be understood that the invention is not limited to mitral valves. Also, the invention is not limited to metal valve construction but is equally applicable to valves having structural parts made of plastic material.

Additional objects and advantages will become apparent and the invention will be better understood from the following detailed description of certain preferred embodiments illustrated in the accompanying drawings. Various changes may be made, however, in the details of construction and arrangement of parts and certain features may be used without others. All such modifications within the scope of the appended claims are included in the invention.

In the drawings:

FIGURE 1 is a perspective view of a heart valve embodying the principles of the invention, wherein the valve cage is integral with the orifice rings;

FIGURE 2 is a greatly enlarged fragmentary sectional view of the valve in FIGURE 1;

FIGURE 3 is a perspective view of a cloth sleeve which forms a part of the suturing ring of the valve;

FIGURE 4 is a perspective view of a second cloth sleeve which encloses the orifice ring of the valve;

FIGURE 5 is a view similar to FIGURE 2, showing a modification in which the orifice ring and cage are made in separate parts;

FIGURE 6 is a perspective view of the orifice ring in FIGURE 5;

FIGURE 7 is a perspective view of the cage in FIGURE 5;

FIGURE 8 is a perspective view of the valve in FIGURE 5 in which the cage legs are covered with cloth sleeves; and FIGURE 9 is a perspective view of one of the sleeves for the cage legs in FIGURE 8.

Referring first to FIGURES 1 and 2, the valve body comprises an orifice or seat ring 10 which is mono-cast integrally with a cage 11 having a plurality of legs to retain a movable valve member 12. The parts 10 and 11 are preferably made of a suitable non-corrodible metal such as Stellite or stainless steel but they may also be made of a suitable plastic, if desired. Valve member 12 is preferably a silicone rubber ball but it may be made of other suitable materials and may assume other shapes such as a disc or ellipsoid. All the materials entering into the valve construction must be acceptable to the human body so as to minimize foreign body reaction and the materials must be of reasonably permanent nature so that they will not deteriorate in the body within the life expectancy of the patient.

The ring 10 is channel shaped in cross section with the downstream edge of the ring being connected with the legs of cage 11. The inside of the ring on its downstream side has a bevelled conical surface 13 to form a seat for the ball but this surface may assume a contoured convex shape if desired. The bottom of the channel on the upstream side of seat 13 is provided with a multiplicity of circumferentially spaced radial openings 14 to promote complete ingrowth of pseudo-intima throughout the entire valve annulus. The arrangement of these openings in the same as shown in FIGURE 6 in connection with the second embodiment. Several rows of holes or circumferential slots may be provided in addition to holes 14 in order to completely perforate ring 10 for complete ingrowth.

In assembling the valve, the cloth sleeve 15 in FIGURE 4 is prepared and folded over the ring 10. This sleeve has a tubular cylindrical shape and is preferably either knitted or woven of a suitable synthetic fiber such as Teflon, Dacron, or the like. Before assembly, the sleeve is provided with a loose draw string 16 near one end with the ends of the string on the inside of the cylinder and the opposite end has formed therein a number of longitudinal slits 20 having a circumferential spacing to receive the legs of cage 11. The outer ends of these slits are preferably formed as V notches as shown.

In applying the sleeve 15 to ring 10, the sleeve is first turned inside out, then the end of the sleeve containing draw string 16 is laid in the channel of the ring with the rest of the sleeve extending in a direction opposite the cage 11 with the positions of slits 20 matching the positions of the legs of cage 11. Draw string 16 is pulled tight and tied to hold the sleeve in this position. Then the notched end of the sleeve is folded through the center of the ring and wrapped around the downstream side of the ring so that the slits straddle the cage legs and the slitted end will overlie the end containing draw string 16.

Draw string 21 is then placed in the overlapped end of the sleeve and pulled tight and tied to stretch the cloth smoothly around the ring 10. Numeral 21a in FIGURE 4 designates the ultimate position of draw string 21 but this draw string is not applied until after the sleeve has been assembled on ring 10 as described. Thus, the sleeve 15 completely envelops the ring 10 with the ends of the sleeve overlapped and with slits 20 straddling the legs of cage 11 and a portion of the sleeve overlying the ball seat surface 13.

A second porous cloth sleeve 25 is prepared as shown in FIGURE 3 having a first circumferential draw string 26 spaced from one end of the sleeve and a second draw string 27 spaced at a suitable distance from the opposite end. The end of sleeve 25 containing draw string 26 is laid over the channel of the ring with the rest of the sleeve extending in a direction opposite from cage 11. Draw string 26 is then pulled tight and tied in the bottom of the channel in ring 10 to hold the sleeve temporarily in place. A winding 30 of suitable filamentary material such as Teflon suture is wound on the cloth in the mid portion of the channel area as shown. Stainless steel wire may be used if the valve body is made of stainless steel or plastic.

A suturable cushion ring 31 of suitable material such as silicone foam rubber is placed over the winding 30. This soft ring is preferably L-shaped in cross section for a mitral valve to provide a wide flange 32 on its inflow face and a small flange 33 at its downstream edge for the purpose of providing a form under the cloth 25 so that it is most advantageously shaped to fit the heart at the location of implantation. The suturing ring can have a shape to optimize coaptation to the aortic tissue bed as well as that which has just been described for the mitral position.

Sleeve 25 is then folded over the cushion ring 31 and draw string 27 is pulled tight and tied to cause the cloth to conform to the angular shape of ring 31. For this purpose the draw string 27 is located in the sleeve so that it will fall inside the corner of the angle between flanges 32 and 33. The remaining end of sleeve 25 is then tucked under flange 33 and stitching 34 is applied to secure abutting portions of the sleeves 15 and 25 together at the cage side of ring 10. Similarly, stitching 35 is placed on the inflow face to secure the two sleeves together.

Finally, sleeve 25 is heat pressed to form a smooth outer surface of the shape shown. The two sleeves as thus assembled provide, in effect, a continuous cloth covering around the orifice ring 10 and the rubber or soft pad insert 31. Any pseudo-intima developing over these surfaces finds secure anchorage in the porous texture of the cloth and through openings 14 so that it will not free itself and be carried away in the blood stream. Insert cushion ring 31 and cloth 25 receive the sutures which connect the valve with surrounding heart tissue at the location of implantation. Valve member 12 is assembled by squeezing it in between the cage legs.

The modification shown in FIGURES 5, 6 and 7 is similar to the first embodiment except that orifice and seat ring 10a is made separate from the cage 11a. This permits the ring to be made of plastic material, if desired, while the cage may be made of metal. However, both parts may be made of metal or both of plastic, if desired. The same reference numerals are used to designate identical parts.

The cage legs have hooked ends 40 for securement to the ring 10a. A cloth sleeve 15a is prepared which is the same as sleeve 15 in FIGURE 4 except that the slits 20 are not necessary and draw string 21 is placed into the cloth before assembly. Sleeve 15a is applied to the ring 10a in the same manner that sleeve 15 is applied to the ring 10 in FIGURE 2. Sleeve 25 in FIGURE 5 is identical with sleeve 25 in FIGURES 2 and 3.

After draw string 26 has been tightened and tied to secure one end of sleeve 25 temporarily, the hooked ends 40 of the cage legs are placed over the draw string 26 as shown and then the windings 30 are applied over these hooked ends to bind the cage legs as well as the underlying sleeve portions securely in the channel of ring 10a. With the application of insert ring 31, the valve is completed as described in connection with FIGURE 2. Another advantage of forming the cage separately from the orifice ring is that it permits use of a valve member 12 which cannot be inserted between the cage legs in assembly.

Insert ring 31 may be provided with holes, channels or grooves in axial, circumferential or radial directions, if desired, to facilitate fibrous ingrowth. The configuration of the suturing ring, which may also be referred to as a cuff portion, may be varied as abovementioned to facilitate suturing in different locations of implantation as, for example, in the mitral, aortic or mitral sub-valvular positions. Similarly, the cage may assume different shapes for use with disc, ellipsoidal or other shaped valve sealing members 12. The two part cage and orifice ring form of construction shown in FIGURES 5, 6 and 7 may also be employed in valves which do not have special provision to support encapsulation by vascularized tissue.

If desired, prior to the assembly of cage 11a to the ring 10a in FIGURE 5, porous cloth sleeves 45 can be installed on the cage legs as shown in FIGURE 8 to provide a valve body which is entirely cloth covered in its final configuration for complete tissue encapsulation with the exception of the moving valve member 12. At their left ends the sleeves 45 are secured under the winding 30 and at their right ends of the sleeves are secured to each other by cross stitching 46 so that no part of the cage is left exposed. If desired, the cage legs in FIGURE 1 may be covered by wrapping them with strips of cloth which are then secured by stitches.

Having now described my invention and in what manner the same may be used, what I claim as new and desire to protect by Letters Patent is:

1. In a heart valve prosthesis having an orifice ring, means for securing said ring to living tissue, a movable valve member, and means to hold said valve member and ring in assembled relation; the improvement comprising a sleeve of porous flexible material such as cloth, the mid portion of said sleeve extending through the center of said ring and covering the inside surface of the ring, end portions of said sleeve being folded over the edges of said ring and disposed on the outside of said ring, and means securing said end portions on the outside of the ring, said means for securing said orifice ring to living tissue comprising a cushion ring surrounding said orifice ring and a second sleeve folded around said cushion ring, and stitchings securing said two sleeves together.

2. A heart valve as defined in claim 1, said ring having openings therein for the growth of tissue through said sleeve and openings.

3. A heart valve as defined in claim 1, said outside of the ring having an outwardly facing channel extending around the ring, said end portions of said first sleeve being overlapped in said channel and said securing means for said end portions of said first sleeve being disposed in said channel.

4. A heart valve as defined in claim 1, including draw strings in said first sleeve disposed on said outside of the ring.

5. A heart valve as defined in claim 1, said means to hold said valve member and ring in assembled relation comprising a cage having legs integral with said ring, said first sleeve having slits in one end thereof straddling said legs.

6. A heart valve as defined in claim 1, said means to hold said valve member and ring in assembled relation comprising a cage having legs separate from said ring, and said means securing said first sleeve to said ring also securing said legs to said ring.

7. A heart valve as defined in claim 6, said outside of the ring having an outwardly facing channel extending around the ring, said legs having hooked ends, and said means securing said first sleeve to said ring comprising a filamentary winding clamping said hooked ends and said sleeve in said channel.

8. A heart valve as defined in claim 1, said second sleeve also being secured by said means which secures said first sleeve to the outside of the orifice ring.

9. A heart valve as defined in claim 8, said means which secures both of said sleeves to the outside of said orifice ring comprising a winding of filamentary material.

10. A heart valve as defined in claim 8, said means to hold said valve member and orifice ring in assembled relation comprising a cage having legs connected with said ring, and sleeves of porous flexible material such as cloth on said legs.

11. A heart valve comprising an orifice ring having an outwardly facing channel therearound, a cloth extending through the center of said ring and covering the inside surfaces of the ring, portions of said cloth being folded over the edges of said ring and disposed in said channel, a suturable annular cuff surrounding said ring and having a portion thereof disposed in said channel, a winding of filamentary material in said channel binding said portions of said cloth and said cuff in said channel, a movable valve member, and means holding said valve member and ring in assembled relation.

12. A heart valve as defined in claim 11 including stitchings securing said cloth to said cuff.

13. A heart valve as defined in claim 11, said means comprising a cage having legs connected with said ring, and cloth sleeves on said legs, said sleeves being connected together at the apex of said cage and having end portions secured at said cuff.

14. A heart valve comprising an orifice ring having an outwardly facing channel therearound, a cloth extending through the center of said ring and covering the inside surfaces of the ring, portions of said cloth being folded over the edges of said ring and disposed in said channel, a suturable annular cuff surrounding said ring and having a portion thereof disposed in said channel, a movable valve member, a cage for said valve member, legs on said cage having hooked ends disposed in said channel, and a winding of filamentary material in said channel binding said cloth, cuff and cage legs in said channel.

References Cited

UNITED STATES PATENTS

| | | | |
|---|---|---|---|
| 3,099,016 | 7/1963 | Edwards | 3—1 |
| 3,143,742 | 8/1964 | Cromie | 3—1 |
| 3,365,728 | 1/1968 | Edwards et al. | 3—1 |

FOREIGN PATENTS 171,082  9/1965  U.S.S.R.

OTHER REFERENCES

"Prosthetic Replacement of the Mitral Valve," The Lancet, Nov. 24, 1962, p. 1087.

RICHARD A. GAUDET, Primary Examiner

RONALD L. FRINKS, Assistant Examiner

U.S. Cl. X.R.

137—533.11, 533.13